United States Patent
Grayson et al.

(10) Patent No.: US 7,724,700 B1
(45) Date of Patent: May 25, 2010

(54) APPLICATION SERVER-CENTRIC QUALITY OF SERVICE MANAGEMENT IN NETWORK COMMUNICATIONS

(75) Inventors: Mark Grayson, Paris (FR); Eric Hamel, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 1349 days.

(21) Appl. No.: 10/648,592

(22) Filed: Aug. 25, 2003

(51) Int. Cl.
*H04W 4/00* (2009.01)
*H04L 12/56* (2006.01)

(52) U.S. Cl. ............ 370/328; 370/338; 370/395.2
(58) Field of Classification Search ............ 370/395.2, 370/395.3, 466, 467; 709/227, 228
See application file for complete search history.

(56) References Cited

U.S. PATENT DOCUMENTS

| | | | |
|---|---|---|---|
| 6,563,793 B1 * | 5/2003 | Golden et al. | 370/236 |
| 6,640,105 B1 | 10/2003 | Shin | |
| 6,654,808 B1 * | 11/2003 | Chuah | 709/227 |
| 6,714,987 B1 * | 3/2004 | Amin et al. | 709/249 |
| 6,854,014 B1 * | 2/2005 | Amin et al. | 709/227 |
| 6,910,074 B1 * | 6/2005 | Amin et al. | 709/227 |
| 7,072,961 B1 * | 7/2006 | Maclean et al. | 709/224 |
| 7,190,668 B1 * | 3/2007 | Francis et al. | 370/229 |
| 7,209,458 B2 * | 4/2007 | Ahvonen et al. | 370/328 |
| 2003/0074443 A1 * | 4/2003 | Melaku et al. | 709/224 |
| 2003/0214905 A1 * | 11/2003 | Solomon et al. | 370/229 |
| 2003/0214958 A1 * | 11/2003 | Madour et al. | 370/401 |
| 2005/0250509 A1 * | 11/2005 | Choksi | 455/452.1 |

OTHER PUBLICATIONS

A. B. García, et al., "Simulation of Quality of Service Mechanisms in the UMTS Terrestrial Radio Access Network," 2002, IEEE, 5 pages.

* cited by examiner

*Primary Examiner*—Pankaj Kumar
*Assistant Examiner*—Marcus R Smith
(74) *Attorney, Agent, or Firm*—Hickman Palermo Truong & Becker LLP

(57) ABSTRACT

An application server-centric approach for managing quality of service in network communications involves an application server causing the modification of an existing communications session with a device, via a layer-2 change to a communications link used by the session, so that the session supports a different quality of service level for the device. The process starts when a request to initiate a communications session is received from a device. A session is initiated with the device, wherein the session supports a first quality of service level. In response to detecting the occurrence of an event, an application server determines that a second quality of service level is to be supported based upon the detected event and service criteria data. The application server then causes the existing session to be modified, via a layer-2 change to the communications link, so that the existing session supports the second quality of service level for the device.

16 Claims, 3 Drawing Sheets

APPLICATION SERVER-CENTRIC QUALITY OF SERVICE MANAGEMENT IN NETWORK COMMUNICATIONS

FIELD OF THE INVENTION

This invention relates generally to quality of service in networks and, more specifically, to an application server-centric approach for managing quality of service in network communications.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

"Quality of service" or "QoS", as it is sometimes called, has become an important issue in networking. In the context of networking, "QoS" generally refers to a guaranteed throughput level or bandwidth to a customer and is often expressed in bits per second. Different QoS levels are needed in different situations. For example, one QoS level may be required to access a text-based service that provides stock prices over a wireless communications link using a device, such as a cell phone, Personal Digital Assistant (PDA) or laptop computer. Using the same wireless device to access a streaming video service would likely require a higher QoS level, to provide a satisfactory user experience.

One approach for selecting a QoS level is to have devices make the selection based upon the requirements of a selected application. For example, suppose that a user of a device selects an icon associated with a particular service. The device consults configuration data that is stored on the device to determine a QoS for the particular service. The device then requests that a communications session be initiated with a communications link that supports the QoS for the particular service. This is accomplished by the device establishing a Layer-2 configuration.

The selection of a QoS level by the device may also involve processing or applying one or more policies or business rules. For example, a policy may specify that this particular user has certain privileges and therefore is entitled to a high QoS level. As another example, the particular user may have purchased a subscription that entitles the user to a high QoS level, and thus a high bandwidth communications link.

There are significant drawbacks associated with devices selecting a QoS and then establishing a communications link to support the selected QoS. First, the software that selects a communications link is often provided by a different vendor than the vendors who provide the applications, which can cause compatibility problems. Also, the QoSs associated with services may change over time, requiring a change to all devices. Similarly, changes to policies, business rules or subscriptions require that the associated devices be updated to reflect the change. This can be very cumbersome and time consuming and is impractical for a large number of devices.

Based upon the foregoing, there is a need for an approach for managing quality of service in network communications that does not suffer from limitations in prior approaches. There is a particular need for an approach for managing quality of service in network communications that reduces the reliance on quality of service selection intelligence built into devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. COMMUNICATIONS ARCHITECTURE STRUCTURE
III. COMMUNICATIONS ARCHITECTURE OPERATION
IV. $3^{RD}$ GENERATION PARTNERSHIP PROJECT (3GPP) EXAMPLE
V. IMPLEMENTATION MECHANISMS, ALTERNATIVES & EXTENSIONS

I. Overview

An application server-centric approach for managing quality of service in network communications is provided. The approach generally involves an application server causing the modification of an existing communications session with a device, such as a wireless device, via a layer-2 change to a communications link used by the session, so that the session supports a different quality of service level for the device. The process starts when a request to initiate a communications session is received from a device. A session is initiated with the wireless device, wherein the session supports a first quality of service level. In response to detecting the occurrence of an event, an application server determines that a second quality of service level is to be supported based upon the detected event and service criteria data. The application server then causes the existing session to be modified, via a layer-2 change to the communications link, so that the existing session supports the second quality of service level for the device. This approach provides for centralized management of communications link selection by an application server based upon policies, business rules and subscription data. This allows policy changes to be made at a single location, for example at an application server, without having to update individual devices. The approach also reduces the amount of intelligence that must be included in devices.

II. Communications Architecture Structure

Figure 1:
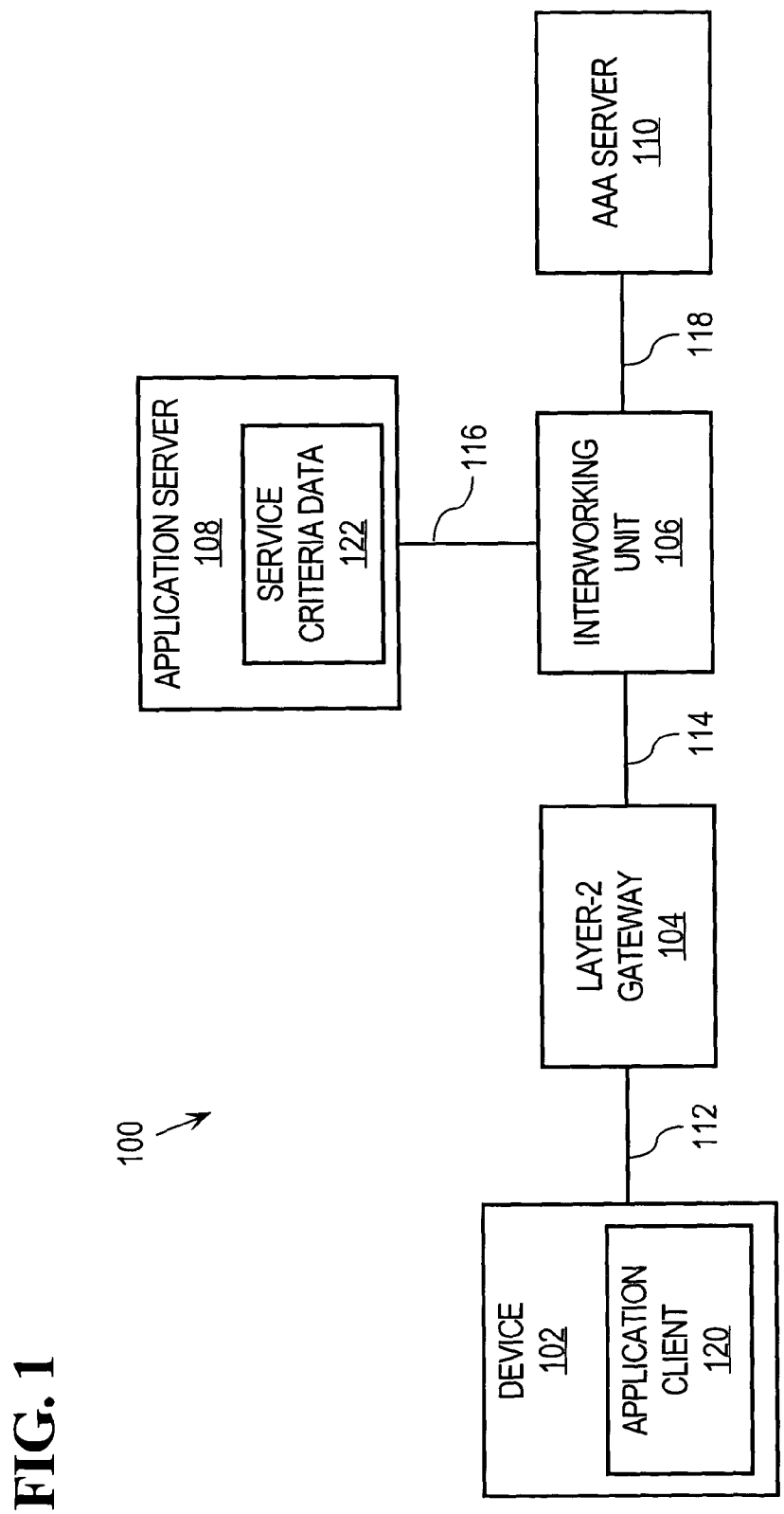
FIG. 1 is a block diagram that depicts a communications architecture configured in accordance with an embodiment.

FIG. 1 is a block diagram that depicts a communications architecture 100 configured in accordance with an embodiment. Architecture 100 includes a device 102, a layer-2 gateway 104, an interworking unit 106, an application server 108 and a AAA server 110. Device 102 is communicatively coupled to layer-2 gateway 104 via a communications link 112. Layer-2 gateway 104 is communicatively coupled to interworking unit via a communications link 114. Interworking unit 106 is communicatively coupled to application server 108 via a communications link 116. Interworking unit 106 is also communicatively coupled to an Authentication, Authorization and Accounting (AAA) server 110 via a communications link 118. Communications links 112, 114, 116, 118 may be implemented by any medium or mechanism that provides for the exchange of data between Layer-2 gateway 104, interworking unit 106 and AAA server 110. Examples of communications links 114, 116, 118 include, without limitation, a network such as a Local Area Network (LAN), Wide Area Network (WAN), Ethernet or the Internet, or one or more terrestrial, satellite or wireless links.

Device 102 may be any type of device and the invention is not limited to any particular type of device. Example devices include, without limitation, portable computers, PDAs, cellular telephones and other wireless devices. In situations where device 102 is a wireless device, then communications link 112 is a wireless communications link. Device 102 may include a Graphical User Interface (GUI) for presenting information to a user and one or more input mechanisms, such as a mouse, keyboard, keypad or touch screen for receiving user input. According to one embodiment of the invention, device 102 is configured with an application client 120 for requesting services and content from application server 108. For example, in response to detecting a user selection of a GUI icon or physical switch associated with a particular service, application client 120 generates and sends a request for the service to application server 108 via layer-2 gateway 104.

Interworking unit 106 aids communications between layer-2 gateway 104, application server 108 and AAA server 110. For example, interworking unit 106 may provide translation services to enable these entities to communicate with each other. Interworking unit 106 may also provide other services. In situations where layer-2 gateway 104 is connected to multiple application servers, interworking unit 106 may be configured to manage multiple QoS requests. For example, interworking unit 106 may be configured to aggregate multiple QoS requests according to a set of business rules to allow a level of oversubscription. The business rules may specify a variety of criteria. For example, the business rules may specify that the highest QoS requested is used to make the layer-2 change. As another example, the business rules may specify priorities or weightings to be applied to QoS requests from different application servers.

Application server 108 manages one or more services and content and makes the services and content available to users, for example to a user of device 102. The invention is not limited to any particular service or content. Example services and content include, without limitation, telephony services, audio/video services including music services and streaming media, Web pages, movies and videos. As is described in more detail hereinafter, application server 108 is configured to determine QoS levels to be supported for particular devices requesting services. Application server 108 makes this determination based upon the services requested and service criteria data 122. Service criteria data 122 may include a wide variety of criteria such as policies, business rules and subscription data. Service criteria data 122 is depicted in FIG. 1 as being maintained within application server 108 for discussion purposes only and service criteria data 122 may be maintained either internal to or external to application server 108, for example in a database external to application server 108.

Application server 108 is also configured to cause a determined QoS level to be implemented mid-session by signaling layer-2 gateway 104 to make a layer-2 change in communications link 112. This may result, for example, in communications link 112 being changed to support a higher or lower QoS level. For example, application server 108 may cause layer-2 gateway 104 to make a layer-2 change in communications link 112 to increase the bandwidth of communications link 112 to support a service that requires a higher bandwidth connection for a user to have a satisfactory experience.

AAA server 110 may be any type of AAA server and the invention is not limited to any particular type of AAA server or any particular AAA server functionality.

Interworking unit 106 and AAA server 110 are optional elements that are not required by the invention, but are provided to aid in an understanding of the operational context of various embodiments of the invention. Furthermore, layer-2 gateway 104, interworking unit 106, application server 108 and AAA server 110 are depicted in FIG. 1 in separate blocks for purposes of explanation. The functionality of these elements, however, may be combined into a single or multiple hardware and software mechanisms that are operating at a single node or distributed across multiple nodes, depending upon the requirements of a particular application.

III. Communications Architecture Operation

Figure 2:
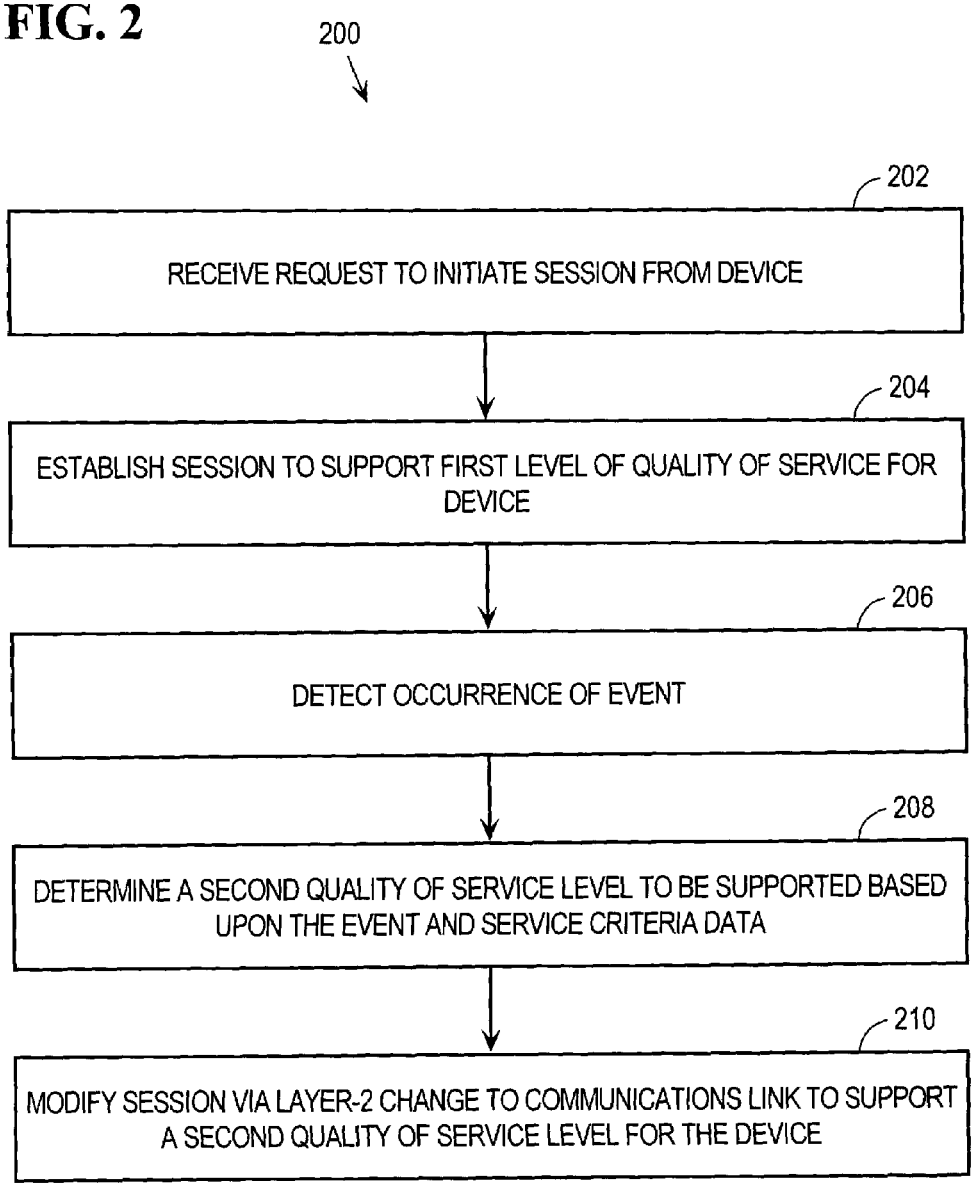
FIG. 2 is a flow diagram that depicts the operation of the communications architecture of FIG. 1.

The operation of communications architecture 100 is now described with reference to a flow diagram 200 of FIG. 2. In block 202, a request is received from a device to initiate a session. For example, device 102 may generate and transmit to layer-2 gateway 104 over communications link 112 a request to initiate a session. In block 204, layer-2 gateway 104 processes the request and initiates and manages a session with device 102. The session uses a communications link that supports a first level of QoS level for device 102. Layer-2 gateway 104 may maintain session context data that defines one or more attributes of the session with device 102. For example, the session context data may specify the bandwidth of communications link 112 or the QoS level supported by the session.

In block 206 the occurrence of an event associated with device 102 is detected. The event associated with device 102 may be any type of event and the invention is not limited to any particular type of event. Events may be generated by device 102. For example, a user may select an icon or button associated with a service on a Personal Digital Assistant (PDA) or a laptop computer. As another example, a user may select an icon on a cell phone associated with a videoconferencing service that the user wishes to initiate. As yet another example, a user may select an icon on a laptop computer to indicate a desire to download music or a video. In response to detecting the user selection, device 102 generates a request for the service or content and provides the request to layer-2 gateway 104, which forwards the request to application server 108. The request may be in any format and conform to any protocol, depending upon the requirements of a particular application. For example, the request may be an HTTP request. Events may also be generated elsewhere by other entities. For example, application server 108 itself may generate an event in response to a user associated with device 102 not making a required subscription payment.

In block 208, a second QoS level to be supported is determined based upon the event and service criteria data 122. According to one embodiment of the invention, application server 108 determines the second QoS level to be supported. The second QoS level may specify, for example, an amount of bandwidth to be allocated to the device or a particular communications link to be used by the device. The service event criteria may include a wide variety of criteria, depending upon the requirements of a particular application. Example service criteria data include, without limitation, policies, business rules and subscription data.

Policies and business rules may specify the level of service to be provided to devices based upon a variety of factors, such as types or classifications of wireless devices, privileges of users associated with wireless devices and organizational membership of users. For example, a device associated with an employee who is a member of an organizational group may be entitled to a particular level of service associated with the organizational group.

Subscription data may specify a particular level of service to be provided to a device based upon a particular subscription service that a user has purchased. For example, subscription data may specify that device 102 is to receive a certain download speed or bandwidth level. Thus, if the user selected to download content, the second QoS level would be determined based upon the content requested and the download speed associated with device 102, as indicated by the subscription data for device 102.

In block 210, the current session is modified, by a layer-2 change to communications link 112, so that the current session supports the second QoS level for device 102. The layer-2 change to communications link 112 may include changing the session context for device 102 at layer-2 gateway 104. This may include, for example, modifying the session context data for device 102 that is maintained by layer-2 gateway 104. According to one embodiment of the invention, application server 108 signals layer-2 gateway 104 to cause the layer-2 change to communications link 112. Layer-2 gateway 104 then signals application server 108 to confirm that the layer-2 change to communications link 112 was made.

IV. 3$^{RD}$ Generation Partnership Project (3GPP) Example

The application server-centric approach for managing quality of service in network communications described herein is applicable to a variety of contexts and protocols and the invention is not limited to any particular context or protocol. Implementation of the approach in the 3GPP context is now described to provide a more specific example.

This example describes AAA based signaling for purposes of explanation, although the procedures described hereinafter may use other protocols for transporting attributes. Normally, AAA server 110 operates in a client-server mode in which layer-2 gateway 104, which manages the sessions, acts as an AAA client to AAA server 110, e.g., providing authentication services.

For session modification triggered by application server 108, the signaling operates in reverse, with application server 108 pushing information to layer-2 gateway 104.

According to one embodiment of the invention, vendor-specific attributes are used to extend the defined AAA signaling to include the definition of QoS. In order to support backwards compatibility, the Change of Authorization (CoA) messages are re-used. More specifically, application server 108 requests the modification of a session using the CoA-Request message. The CoA message sent by application server 108, however, does not need to carry a Filter-ID message. Layer-2 gateway 104 responds with either a CoA-ACK or a CoA-NAK message. A CoA-ACK message indicates that layer-2 gateway 104 has successfully initiated the session modification procedure, i.e., that layer-2 gateway 104 has successfully interpreted the message and has triggered a session modification. After successfully modifying the session context, layer-2 gateway 104 generates and sends to AAA Server 110 a AAA Accounting Interim message. Section 16.4.7 of "3$^{rd}$ Generation Partnership Project; Technical Specification Group Core Network; Packet Domain; Interworking between the Public Land Mobile Network (PLMN) supporting Packet Based Services and Packet Data Networks (PDN)" (Release 5); 3GPP TS 29.061 V5.3.0 (2002-09), the contents of which are incorporated herein by reference in their entirety for all purposes, defines the transport of the 3GPP-GPRS-Negotiated-QoS-Profile in the RADIUS ACCOUTING Request type INTERIM that follows a context modification. A CoA-NAK message indicates that layer-2 gateway 104 cannot implement the requested change.

Interworking unit 106 is configured to proxy AAA Accounting Interim messages between the Layer-2 gateway 104 and the AAA Server 110. The Interworking unit 106 is able to intercept the AAA messages and translate requests for QoS modifications received from application server 108 into CoA-specific commands and to translate the 3GPP-Specific QoS messages received from the layer 2 gateway 104 into QoS modification responses to be forwarded to the application server 108. For example, interworking unit 106 will have already received QoS attributes in AAA Accounting messages from which it can determine whether a session corresponds to a GPRS R98 session or a GPRS R99 session. This is important since the semantics of the QoS profiles is different between the two techniques. This approach allows interworking unit 106 to exist in isolation, be embodied within layer-2 gateway 104 or be embodied within the application server 108. Using the example of interworking unit 106 operating either in isolation or embedded within application server 108, the 3GPP-GPRS-Negotiated-QoS-Profile is included in the AAA CoA message as a vendor specific attribute. An example is included in Table I below:

TABLE I code: 222 (example), UTF-8 encoded QoS profile syntax
len: 3

```
+-+-+-+-+-+-+-+-+
|a|b|  c  |d|e|f|
+-+-+-+-+-+-+-+-+
``` a = 26 (Radius attribute for vendor specific)
b = len (length of the Radius vendor-specific)
c = 9 (Cisco vendor ID)
d = 222 (sub-attribute ID for 3GPP QoS Profile)
e = len (length of the vendor-specific attribute)
f = - see below
QoS profile value: Text An example of the UTF-8 encoded QoS profile syntax is provided below in Table II:

TABLE II

"<Release indicator> - <release specific QoS IE UTF-8 encoding>"
<Release indicator> = UTF-8 encoded number :
  "98" = Release 98
  "99" = Release 99
<release specific QoS profile UTF-8 encoding> = UTF-8 encoded QoS profile for the release indicated by the release indicator.
  The UTF-8 encoding of a QoS IE is defined as follows: each octet is described by 2 UTF-8 encoded digits, defining its hexadecimal representation. The QoS profile definition is in 3G TS 24.008
  The release 98 QoS profile data is 3 octets long, which then results in a 6 octets UTF-8 encoded string,
  The release 99 QoS profile data is 11 octets long, which results in a 22 octets UTF-8 encoded string.

After receiving a CoA message from Interworking Unit 106, layer-2 gateway 104 triggers a session modification procedure. In the example of GPRS, the GGSN triggers a network-initiated context modification procedure as described in Section 9.2.3.2 of "3$^{rd}$ Generation Partnership Project; Technical Specification Group Services and System Aspects; General Packet Radio Service (GPRS); Service Description; Stage 2 (Release 5)"; 3GPP TS 23.060 V5.3.0 (2002-09), the contents of which are incorporated herein by reference for all purposes. This approach may therefore be used irrespective of UE and SGSN capability, other than to support the context modification procedure. The approach may include modifying a portion of a QoS profile or an entire QoS profile, to affect not only bandwidth at the access, but also to put a requirement on delay and jitter.

In this example, RADIUS Interim accounting with QoS attributes is already supported, e.g., for QoS-based charging. Also AAA re-authorization is also supported, e.g., for terminating a session when a user's pre-pay balance has expired. This example illustrates interworking unit 106 triggering the sending of the AAA CoA message with QoS attributes obtained from application server 108 by a second interface. Interworking unit 106 maintains a state machine of the QoS change requests received from application server 108 that are sent in CoA messages to layer-2 gateway 104. After sending a CoA message to layer-2 gateway 104, interworking unit 106 starts a timer and listens for changes to the negotiated QoS advertised using the AAA Accounting Interim message. If the timer expires, interworking unit 106 either re-triggers the sending of a CoA message, or, after a specified number of unsuccessful attempts to trigger a QoS change, informs application server 108 that the session modification was unsuccessful. After receiving an indication of a modified session QoS, interworking unit 106 informs application server 108 that its request has been processed and includes the new negotiated QoS in the response.

V. Implementation Mechanisms, Alternatives & Extensions

Figure 3:
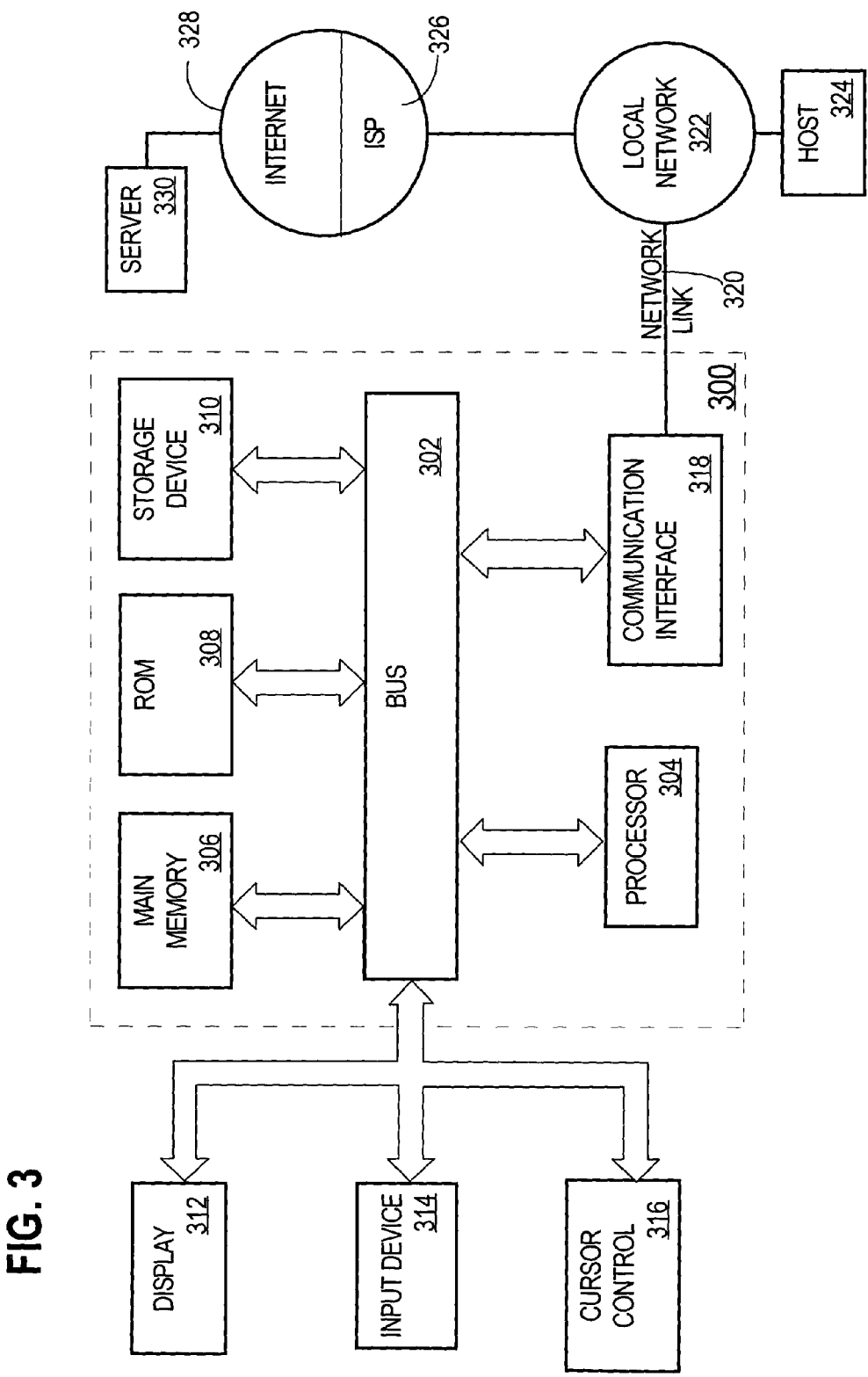
FIG. 3 is a block diagram that depicts a computer system on which embodiments of the present invention may be implemented.

The application server-centric approach described herein for managing quality of service in network communications is applicable to a variety of contexts. FIG. 3 is a block diagram that illustrates an example computer system 300 upon which an embodiment of the invention may be implemented. Computer system 300 may also serve as the computing platform for application server 108. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for managing quality of service in network communications. According to one embodiment of the invention, managing quality of service in network communications is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for managing quality of service in network communications as described herein.

Processor 304 may execute the code as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In an application server communicatively coupled to a layer-2 gateway device, the layer-2 gateway device and a user device having established therebetween a communications session that supports a first quality of service level, a method for managing the communications session established between the layer-2 gateway device and the user device, the method comprising the computer-implemented steps of:

the application server receiving a request that originated from the user device;

wherein the request is a request for a particular application service provided by the application server;

in response to receiving the request, the application server determining based upon the request for the particular application service and policy criteria, a second quality of service level to be supported by the communications session; and the application server sending an Authentication, Authorization, and Accounting (AAA) Change of Authorization (CoA) message to the layer-2 gateway device;

wherein said message specifies a quality of service profile for the second quality of service level to be supported by the communications session;

wherein the step of sending a message causes the layer-2 gateway device to make a layer-2 change in a communications link used for the communications session so that the communications session supports the second quality of service level instead of the first quality of service level.

2. The method as recited in claim 1, wherein the step of sending a message to the layer-2 gateway device causes a modification of session context data maintained by the layer-2 gateway device and associated with the communications session.

3. The method as recited in claim 1, wherein the first and second quality of service levels each specifies an amount of bandwidth to be allocated to the user device.

4. The method as recited in claim 1, wherein the user device is a wireless device.

5. The method of claim 1, further comprising:

receiving an acknowledgement from the layer-2 gateway device that indicates that a layer-2 change was made in a communications link used for the communications session.

6. An application server capable of being communicatively coupled to a layer-2 gateway device, the layer 2 gateway device and a user device having established there between a communications session that supports a first quality of service level, the application server being configured to:

receive a request forwarded by the layer-2 gateway device that originated from the user device;

wherein the request does not specify a desired quality of service level for the communications session, in response to receiving the request, determine based upon the request for the service and policy criteria, a second quality of service level to be supported by the communications session; and send an Authentication, Authorization, and Accounting (AAA) Change of Authorization (CoA) message to the layer-2 gateway device that specifies a quality of service profile for the second quality of service level to be supported by the communications session thereby causing the layer-2 gateway device to make a layer-2 change in a communications link used for the communications session so that the communications session supports the second quality of service level instead of the first quality of service level.

7. The application server as recited in claim 6, wherein the application server is further configured to send a message to the layer 2 gateway device that specifies a quality of service profile for the second quality of service level thereby causing the layer-2 gateway device to modify session context data maintained by the layer-2 gateway device and associated with the communications session.

8. The application server as recited in claim 6, wherein the first and second quality of service levels each specifies an amount of bandwidth to be allocated to the user device.

9. The application server as recited in claim 6, wherein the user device is a wireless device.

10. The application server of claim 6, further configured to:

receive an acknowledgement from the layer-2 gateway device that indicates that a layer-2 change was made in a communications link used for the communications session.

11. An application server capable of being communicatively coupled to a layer-2 gateway device, the layer-2 gateway device and a user device having established therebetween a communications session that supports a first quality of service level, the application server comprising:

means for receiving a request forwarded by the layer-2 gateway device that originated from the user device;

wherein the request is a request for a particular application service provided by the application server;

means, operable in response to receiving the request, for determining based upon the request for the particular application service and policy criteria, a second quality of service level to be supported by the communications session;

means for sending an Authentication, Authorization, and Accounting (AAA) Change of Authorization (CoA) message to the layer-2 gateway device;

wherein said message specifies a quality of service profile for the second quality of service level to be supported by the communications session; and wherein the means for sending a message is operable to cause the layer-2 device gateway to make a layer-2 change in a communications link used for the communications session so that the communications session supports the second quality of service level instead of the first quality of service level.

12. The application server as recited in claim 11, wherein the means for sending a message further comprises means for sending a message to the layer-2 gateway device that specifies a quality of service profile for the second quality of service level thereby causing the layer-2 gateway device to modify session context data maintained by the layer-2 gateway device and associated with the communications session.

13. The application server as recited in claim 11, wherein the application server further comprises means for specifying the quality of service profile for the second quality of service level using a vendor-specific attribute containing the $3^{rd}$ Generation Partnership Project 3GPP-Negotiated-QoS attribute.

14. The application server as recited in claim 11, wherein the first and second quality of service levels each specifies an amount of bandwidth to be allocated to the user device.

15. The application server as recited in claim 11, wherein the user device is a wireless device.

16. The application server of claim 11, further comprising:

means for receiving an acknowledgement from the layer-2 gateway device that indicates that a layer-2 change was made in a communications link used for the communications session.

\* \* \* \* \*